United States Patent Office 3,466,289
Patented Sept. 9, 1969

3,466,289
1-HETEROCYCLIC-1,2,3,4-TETRAHYDROISO-
QUINOLINES AND PROCESSES
John Mervyn Osbond, Hatfield, and James Charles Wickens, St. Albans, England, assignors to Hoffmann-La
Roche Inc., Nutley, N.J., a corporation of New Jersey
No Drawing. Filed Sept. 3, 1965, Ser. No. 485,127
Claims priority, application Great Britain, Sept. 22, 1964,
38,571/64, 38,572/64
Int. Cl. C07d 35/18, 57/00, 99/06
U.S. Cl. 260—288         7 Claims

ABSTRACT OF THE DISCLOSURE

Pharmacologically active 1,2,3,4-tetrahydroisoquinolines having at position-1 a heterocyclic group such as, for example, 2-hydroxy-2-[pyridyl-(2)]ethyl, 2-hydroxy-2-[thienyl-(2)]ethyl and the like, are prepared, for instance, from the corresponding 3,4-dihydroisoquinoline N-oxide and heterocyclic compound possessing an unsaturated side chain, such as, for example, 4-vinyl pyridine or 2-vinyl thiophene. The products are useful analgesic agents.

---

The present invention relates, in general, to novel compounds and to a process for producing same. More particularly, the invention relates to therapeutically active isoquinoline compounds and to the production thereof.

In one of its comprehensive embodiments, the invention is concerned with isoquinoline compounds having the formula

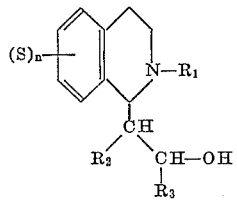

I in which the symbol $R_1$ represents an alkyl group; $R_2$ represents hydrogen or an alkyl group; $R_3$ represents a 5- or 6-membered oxygen-, nitrogen- or sulfur-containing heterocyclic radical joined through one of its carbon atoms; in which the symbol S represents an alkyl, alkoxy or hydroxy group or an alkylenedioxy group formed by two adjacent alkoxy substituents; and in which the symbol $n$ represents an integer of from 0 to 3, and salts of such compounds with medicinally acceptable acids.

In another comprehensive embodiment, the invention is concerned with a method of producing the novel compounds of Formula I as well as compounds of the type represented by Formula I, but in which the symbol $R_3$ represents an unsubstituted phenyl group or a phenyl group substituted with from 1 to 3 halogen atoms or alkyl or alkoxy radicals.

The terms "alkyl group" and "alkoxy group" comprise straight-chain and branched-chain alkyl and alkoxy groups containing up to 7 carbon atoms, methyl and methoxy being preferred. The term "halogen" comprises fluorine, chlorine, bromine and iodine, chlorine being preferred. A particularly preferred halogen-substituted phenyl group is p-chloro-phenyl.

A particularly interesting group of compounds which fall within the scope of Formula I are those in which $R_1$ is a methyl group, $R_2$ is hydrogen, $R_3$ is pyridyl-(2), pyridyl-(4) or thienyl-(2) and S represents 6,7-dialkoxy, especially 6,7-dimethoxy, substitution.

The novel compounds of Formula I, as well as the acid addition salts thereof, have been found to be useful as analgesics.

The compounds of this invention are readily prepared. In the first step of the preparative method, an N-oxide having the formula

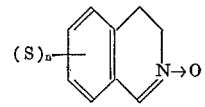

II in which the symbols S and $n$ have the same meaning as in Formula I is condensed with a vinyl compound having the formula $$R_2\text{---}CH\text{=}CH\text{---}R_3 \qquad \text{III}$$

in which the symbols $R_2$ and $R_3$ have the same significance as in Formula I.

In the second step of the preparative method, the condensation product, which is obtained in the first step, is hydrogenolyzed and, in the third step, the hydrogenolysis product is N-alkylated. In an alternate embodiment of the invention, which is applicable only in those instances in which the $R_3$ substituent is a radical other than a nitrogen-containing heterocyclic group, the condensation product can first be N-alkylated, following which the N-alkylation product is subjected to hydrogenolysis. Stated differently, where a condensation product is produced by reacting the N-oxide of Formula II with a vinyl compound of Formula III in which $R_3$ is an oxygen- or sulfur-containing heterocyclic radical or an unsubstituted or alkyl-, alkoxy-, or halo-substituted phenyl group, the condensation product, thus obtained, can be N-alkylated and the N-alkylation product subjected to hydrogenolysis. The product which is obtained by either of the two reaction sequences can be converted, by appropriate means, into a medicinally acceptable acid addition salt. The expression "medicinally acceptable acid addition salt" is used herein to denote a salt produced by reacting the base of Formula I with a medicinally acceptable acid.

The N-oxide starting materials of Formula II are prepared readily by oxidizing the corresponding 3,4-dihydroisoquinoline compound by means of the use of hydrogen peroxide.

The preparative method of this invention can be depicted as follows:

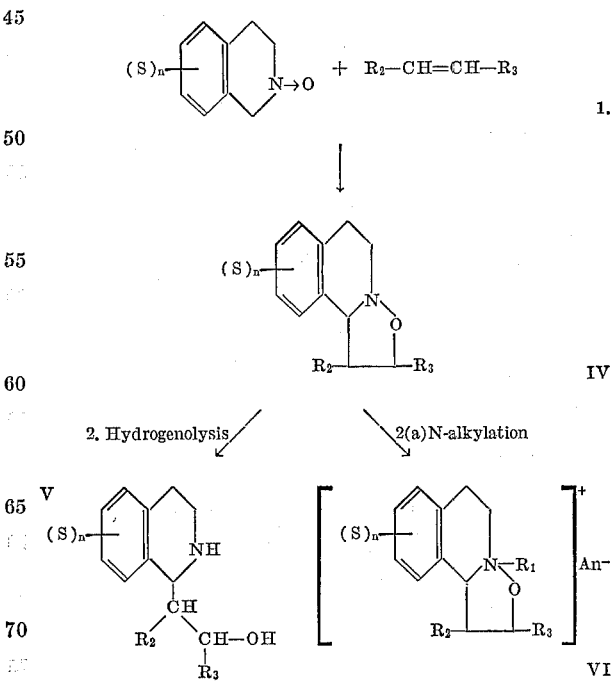

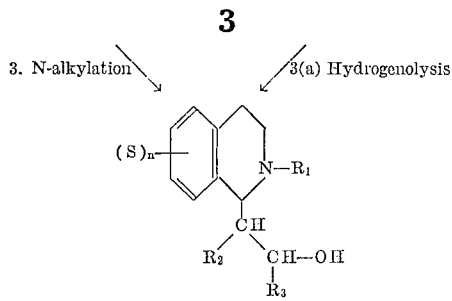

In the foregoing, the symbols $R_1$, $R_2$, $R_3$, S and $n$ have the same meanings as in Formula I and the symbol "An" denotes an anion. $R_3$ includes also the unsubstituted phenyl radical and a phenyl radical substituted with up to three halogen atoms or three alkyl or alkoxy radicals. As indicated heretofore, however, the reaction sequence represented as Steps 2a and 3a in the foregoing flow sheet is not applicable to condensation products, produced by Step I, in which $R_3$ is a nitrogen-containing heterocyclic group.

The condensation of the N-oxide compound of Formula II with the vinyl compound of Formula III is readily carried out. This reaction is effected, most advantageously, at a temperature which is elevated somewhat above room temperature. The reaction can be carried out at a low temperature, e.g., at room temperature, if desired but, at such temperature, the reaction proceeds ordinarily in a relatively slow manner. In the preferred embodiment of the invention, the condensation is carried out at a temperature within the range of from about 70° C. to about 75° C. Furthermore, in this reaction it is preferred to incorporate into the system a polymerization inhibitor, for example, hydroquinone. By the use of such an inhibitor, polymerization of the vinyl component is avoided. The condensation products of Formula IV, which can be referred to as 1,5,6,10b-tetrahydro-2H-isoxazolo[3,2-a]isoquinolines, can be obtained and isolated, if desired, in the form of their acid addition salts. Such salts include, for example, salts of inorganic acids, such as, hydrochloric acid, sulfuric acid, nitric acid, phosphoric acid, etc. as well as salts of organic acids, such as, benzoic acid, citric, acid, malic acid, maleic acid, salicylic acid, etc.

The hydrogenolysis step, i.e., Step 2 of the foregoing flow sheet, can be carried out conveniently using hydrogen in the presence of palladium-charcoal catalyst. Furthermore, the hydrogenolysis reaction is effected most conveniently in the presence of a solvent which is inert under the conditions of the reaction. While any number of solvents can be employed, it has been found that lower molecular weight aliphatic monohydroxy alcohols, for example, methanol, are especially well suited for use. Alkylation of the hydrogenolysis product of Formula V is carried out advantageously by reacting the hydrogenolysis product with an appropriate aliphatic aldehyde and hydrogen in the presence of a suitable catalyst, such as, platinum oxide. When there is no competing center, as, for example, where $R_3$ of the Formula V compound is a phenyl radical, the N-alkylation step can be carried out using any of the conventional alkylating agents. These include, for example, alkyl halides, such as, methyl iodide, ethyl bromide, etc.; dialkyl sulfates, such as, dimethyl sulfate, etc.

The steps of the preparative method which are depicted in the foregoing flow sheet and designated as Steps 2a and 3a are readily carried out. In this particular sequence of steps, the N-alkylation can be effected using any of the conventional alkylating agents referred to heretofore. Advantageously, however, N-alkylation is carried out by dissolving the condensation product in a suitable solvent, for example, methanol, and subsequenlty adding the alkylating agent thereto. There is thus obtained, the compound of Formula VI which, for convenience, can be designated as a 4-alkyl-1,5,6,10b-tetrahydro-2H-isoxazolo [3,2-a]isoquinolinium salt. In the second step of this particular sequence, i.e., Step 3a of the flow sheet, the salt of Formula VI is hydrogenolyzed, for example, using hydrogen in the presence of platinum oxide. Such hydrogenolysis can be carried out at room temperature and atmospheric pressure. Preferably, the hydrogenolysis is carried out in a solvent in which the salt is solvent in which the salt is soluble and which is inert under the conditions of the reaction. While any one of several solvents are suitable for use, a lower molecular weight, monohydroxy aliphatic alcohol such as, methanol, is preferably employed.

The compounds of Formula I are bases and, as indicated heretofore, they can be converted readily into acid addition salts. Conversion of the bases into such salts can be effected in any conventional manner. In preparing the salts, the Formula I compound can be treated with an inorganic acid, such as, hydrochloric acid, hydrobromic acid, nitric acid, sulfuric acid, phosphoric acid, etc., or with an organic acid, such as, citric acid, tartaric acid, maleic acid, malic acid, succinic acid, fumaric acid, etc.

Thus, while the foregoing process is utilized primarily as a means for preparing the compounds of Formula I, it is operable, in like manner, in the production of other compounds which, in and of themselves, have pharmaceutical utility. Thus, for example, the described process has been found to be an effective means for preparing compounds having the formula

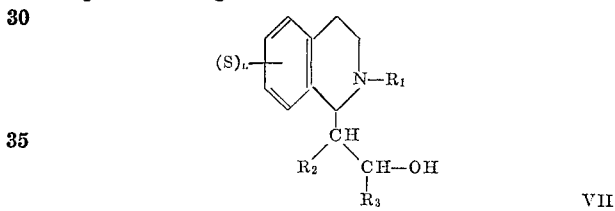

in which the symbols $R_1$, $R_2$, $R_3$, S and $n$ have the same meanings as in Formula I and in which the symbol $R_3$ represents, additionally, an unsubstituted phenyl group or phenyl group containing from 1 to 3 halogen atoms or from 1 to 3 alkyl or alkoxy radicals.

In preparing compounds which are encompassed within the scope of Formula VII an N-oxide having the structure depicted in Formula II is condensed with a vinyl compound having the formula

$$R_2-CH=CH-R_3$$

in which $R_3$ has the same meaning as in Formula VII.

As indicated heretofore, the compounds of Formula I, and the acid addition salts thereof, are pharmacologically active, being useful and used as analgesic agents. They can be employed as medicaments, for example, in the form of conventional pharmaceutical compositions. Thus, for example, the compounds of Formula I, either in the form of the free base or as an acid addition salt thereof can be used as such or in admixture with other compounds, and they can be embodied in a form suitable for enteral or parenteral administration. For example, the compounds of this invention can be mixed with inert adjuvants, either inorganic or organic in nature, such as water, gelatin, lactose, starch, magnesium stearate, talc, vegetable oils, polyalkylene glycols, vaseline, etc. These pharmaceutical preparations can be provided in the form of tablets, dragees, suppositories or they can be incorporated into suitable capsules. Additionally, the compounds of the invention may be provided in liquid dosage form, for example, as solutions, suspensions or emulsions. If desired, the products can be stabilized and/or mixed with adjuvant materials, such as, preservatives, stabilizers, wetting or emulsifying agents, salts for altering osmotic pressure or buffers. Finally, the compounds of the invention can be used in admixture with other therapeutically valuable substances. The active component of any and all of these various dosage forms will be present in therapeutically effective amounts. The dosage present in any such dosage form will be variable depending upon the needs and requirements of the patient as diagnosed by the prescribing physician.

For a fuller understanding of the nature and objects of this invention, reference may be had to the following examples which are given merely as further illustrations of this invention and are not to be construed in a limiting sense.

Example 1

A mixture of 1.0 gram (0.00483 mol) of 3,4-dihydro-6,7-dimethoxy-isoquinoline N-oxide, 2.0 grams (0.190 mol) of 4-vinylpyridine and a few crystals of hydroquinone were heated at a temperature of 75° C. for 16 hours. At the end of this period of time, excess vinylpyridine was removed under reduced pressure. The resulting syrup was treated with 25 ml. of methanol, 8-9-dimethoxy - 2 - [pyridyl-(4)]-1,5,6,10b-tetrahydro-2H-isoxazolo[3,2-a]isoquinoline separating as buff prisms of the free base of melting point 160° C. to 164° C. The free base was converted to the dihydrochloride salt and this salt was crystallized from methanol/ether as colorless prisms of melting point 180° C. to 181° C., with decomposition.

A solution of 2.57 grams (0.067 mol) of 8,9-dimethoxy - 2 - [pyridyl - (4)]-1,5,6,10b-tetrahydro-2H-isoxazolo[3,2-a]isoquinoline dihydrochloride, produced as described in the preceding paragraph, in a mixture of 150 ml. of methanol and 5 ml. of water was hydrogenated at room temperature and atmospheric pressure in the presence of 0.5 gram of 5% palladium on carbon catalyst. The hydrogen uptake after 25 minutes was 176 ml. (theoretical uptake: 160.5 ml. at room temperature and atmospheric pressure). After hydrogenation, the catalyst was removed by filtration, the filtrate was evaporated and co-distilled twice with ethanol. The residue was crystallized twice from ethanol/ether to yield 6,7-dimethoxy - 1 - [2 - hydroxy - 2 - [pyridyl-(4)]-ethyl]-1,2,3,4-tetrahydro-isoquinoline dihydrochloride as colorless prisms of melting point 239° C. to 241° C., with decomposition. Recrystallization of the compound from methanol/ether gave colorless prisms of melting point 243° C. to 245° C., with decomposition.

3.87 grams (0.001 mol) of 6,7-dimethoxy-1-[2-hydroxy - 2 - [pyridyl - (4)]-ethyl]-1,2,3,4-tetrahydro-isoquinoline dihydrochloride, produced as described in the preceding paragraph, were converted into the free base and dissolved in 100 ml. of methanol. 3 ml. (ca. 0.04 mol) of 40% formaldehyde solution and 0.2 gram of platinum catalyst were added and the mixture was hydrogenated at room temperature and atmospheric pressure. Uptake of hydrogen appeared complete after about thirty hours, when 295 ml. of hydrogen had been taken up (theoretical uptake for 0.001 mol plus catalyst: 287 ml. at room temperature and atmospheric pressure). The catalyst was removed by filtration and the filtrate was evaporated to a syrup which was co-distilled twice with benzene. The syrup was then dissolved in ethanol and treated with ether/hydrogen chloride solution to yield 6,7 - dimethoxy - 1 - [2 - hydroxy - 2 - [pyridyl-(4)]-ethyl] - 2-methyl-1,2,3,4-tetrahydro-isoquinoline dihydrochloride as a white crystalline precipitate of melting point 195° C. to 200° C. (sintering at 150° C.). Recrystallization from ethanol/ether gave slightly hygroscopic colorless prisms of melting point 165° C. to 170° C. Conversion of the hydrochloride into the free base, followed by crystallization from benzene/petroleum ether (60° C. to 80° C.) yielded colorless prisms of melting point 91° C. to 92.5° C.

For completeness of disclosure, there is included hereinafter a description of the preparation of the 3,4-dihydro - 6,7 - dimethoxy - isoquinoline N-oxide. It should be understood, however, that neither that compound nor its preparation is part of this invention.

Thus, 19.1 grams (0.1 mol) of 3,4-dihydro-6,7-dimethyl-isoquinoline were dissolved in 30 ml. of glacial acetic acid. 9 ml. (0.079 mol) of 30% hydrogen peroxide solution were added to the stirred solution and the mixture was heated at a temperature of 75° C. for 2.5 hours. A second addition of 8 ml. (0.706 mol) of 30% hydrogen peroxide solution was made, and heating was continued for a further two hours. The reaction mixture was concentrated under reduced pressure and the residual syrup was treated with hot sodium carbonate solution until alkaline. The oil which separated was extracted into chloroform and the combined extracts were washed twice with water and dried over sodium sulfate. The chloroform was evaporated and the resulting syrup was crystallized from chloroform/ethyl ether, yielding 3,4-dihydro-6,7 - dimethoxy - isoquinoline N-oxide as brown prisms which melted at 170° to 177° C. Recrystallization from chloroform/ethyl ether gave buff prisms of melting point 178° C. to 182° C.

A sample of the N-oxide was converted to hydrochloride, which recrystallized from ethanol/ethyl ether as buff prisms of melting point 215° C. to 217° C., with effervescence.

Example 2

8,9 - dimethoxy - 2 - [thienyl - (2)] - 1,5,6,10b - tetrahydro - 2H - isoxazolo[3,2 - a]-isoquinoline hydrochloride (melting point 155° C. to 156° C.) was obtained from 2-vinyl thiophene and 6,7 - dimethoxy - 3,4 - dihydro - iso-quinoline N-oxide according to the procedure described in Example 1.

(a) The 8,9-dimethoxy-2-[thienyl-(2)]-1,5,6,10b-tetrahydro - 2H - isoxazolo[3,2 - a]-isoquinoline obtained was converted into 6,7-dimethoxy-1-[2-hydroxy - 2 - [thienyl-(2)]-ethyl]-1,2,3,4-tetrahydro-isoquinoline (melting point 105° C. to 107.5° C.) by the hydrogenolysis procedure described in Example 1.

The 1,2,3,4-tetrahydro-isoquinoline, produced as described in the preceding paragraph, was converted into 6,7 - dimethoxy - 1 - [2 - hydroxy - 2 - [thienyl - (2)]-ethyl] - 2 - methyl - 1,2,3,4-tetrahydro-isoquinoline (melting point of the hydroiodide 120° C. to 123° C.) by reduction methylation, using formaldehyde and hydrogen in the presence of platinum oxide catalyst.

(b) The isoxazolo[3,2-a]isoquinoline, prepared as described in the first paragraph of this example, was N-methylated using methyl iodide to give 8,9-dimethoxy-2 - [thienyl - (2)] - 4 - methyl-1,5,6,10b-tetrahydro-2H-isoxazolo[3,2-a]-isoquinolinium iodide of melting point 130° C. to 133° C.

The foregoing iodide was hydrogenolysed to give 6,7-dimethoxy - 1 - [2 - hydroxy - 2 - [thienyl - (2)] - ethyl]-2-methyl-1,2,3,4-tetrahydro-isoquinoline, the hydroiodide of which melted at 120° C. to 123° C.

Example 3

(a) By the reaction of 3,4-dihydro-6,7-dimethoxy-iso-quinoline N-oxide with 2-vinyl pyridine, in the manner described in Example 1, there was obtained 8,9-dimethoxy - 2 - [pyridyl - (2)] - 1,5,6,10b - tetrahydro - 2H-isoxazolo[3,2-a]isoquinoline melting at 164° C. to 165° C.

(b) By the hydrogenation of the dihydrochloride salt of 8,9-dimethoxy - 2 - [pyridyl-(2)]-1,5,6,10b-tetrahydro-2H-isoxazolo[3,2-a]isoquinoline, in the manner described in Example 1, 6,7-dimethoxy-1-[2-hydroxy-2-[pyridyl-(2)] - ethyl] - 1,2,3,4-tetrahydroisoquinoline dihydrochloride, melting at 229° C. to 233° C. was obtained.

(c) By the N-alkylation of 6,7 - dimethoxy - 1 - [2-hydroxy - 2 - [pyridyl - (2)] - 1,2,3,4 - tetrahydroisoquinoline dihydrochloride, in the manner described in Example 1, there was obtained 6,7-dimethoxy-1-[2-hydroxy-2-[pyridyl - (2)] - ethyl] - 2-methyl-1,2,3,4-tetrahydroisoquinoline dihydrochloride melting at 229° C. to 233° C.

Example 4

This example is included to demonstrate alternate methods for preparing the compound of Formula VII in which $R_3$ is chloro-substituted phenyl radical.

Ia. A mixture of 2 grams (0.0097 mol) of 3,4-dihydro-6,7 - dimethoxy-isoquinoline N-oxide, 1.55 gram (0.0112 mol) of p-chloro-styrene, and a few crystals of hydroquinone was heated at 70° C. to 75° C. for 12 hours, at which time thin layer chromatography showed disappearance of the N-oxide from the reaction mixture. Excess p-chloro-styrene was removed under reduced pressure and, on crystallization from methanol, the residue yielded 8,9-dimethoxy - 2 - (4 - chloro-phenyl) - 1,5,6,10b-tetrahydro - 2H - isoxazolo - [3,2-a]isoquinoline as buff prisms melting at 115° C. to 120° C. Recrystallization from ethanol gave colorless needles of melting point 127° C. to 128° C.

Ib. 1.73 gram (0.005 mol) of the 8,9 - dimethoxy - 2-(4 - chloro-phenyl) - 1,5,6,10b - tetrahydro-isoxazolo [3,2-a]N-isoquinoline, prepared as described in paragraph Ia of this example was dissolved in 25 ml. of methanol and the solution was treated with ethanolic hydrogen chloride until it was just acid. The solution was hydrogenated at atmospheric temperature and pressure in the presence of 0.1 gram of platinum oxide catalyst. After uptake of the theoretical quantity of hydrogen the solution was filtered, concentrated, and treated with ether to yield crystalline 6,7 - dimethoxy - 1 - [[2-hydroxy - 2 - (4 - chlorophenyl)] - ethyl] - 1,2,3,4 - tetrahydro-isoquinoline hydirochloride, of melting point 159° C. to 160° C. Recrystallization from methanolether gave prisms of melting point 163° C.

Ic. The 6,7 - dimethoxy - 1 - [[2 - hydroxy-2-(4-chlorophenyl)] - ethyl] - 1,2,3,4 - tetrahydro-isoquinoline, produced as described in paragraph Ib of the example was converted into the 6,7 - dimethoxy - 1 - [[2-hydroxy-2-(4-chloro-phenyl)] - ethyl] - 2 - methyl - 1,2,3,4 - tetrahydro-isoquinoline (melting point 125° C. to 126.5° C.) by reductive methylation using formaldehyde and hydrogen in the presence of platinum oxide.

IIa. 2 grams (0.0058 mol) of 8,9 - dimethoxy - 2 - (4-chloro-phenyl) - 1,5,6,10b - tetrahydro - 2H - isoxazolo [3,2-a] isoquinoline, produced as described in paragraph Ia of this example, were dissolved in 50 ml. of methanol. 2 ml. (0.021 mol) of methyl iodide were added, and the solution was boiled under gentle reflux for 15 minutes. A further addition of 2 ml. (0.021 mol) of methyl iodide was then made, and the heating was continued for a further 15 minutes. Colorless crystals of the methiodide separated from the hot solution and crystallization was completed by the addition of ether. There was thus obtained 8,9 - dimethoxy - 2 - (4 - chloro-phenyl)-4-methyl - 1,5,6,10b - tetrahydro - 2H - isoxazolo [3,2-a] isoquinolinium iodide of melting point 151° C. to 154° C. Recrystallization from methanol gave colorless needles of melting point 151° C. to 152° C.

IIb. 1.0 gram (0.00205 mol) of the 8,9 - dimethoxy-2-(4 - chloro-phenyl) - 4 - methyl - 1,5,6,10b - tetrahydro-2H - isoxazolo [3,2-a] isoquinolinum iodide, prepared as described in the immediately preceding paragraph was dissolved in 100 ml. of methanol. The solution was hydrogenated at room temperature and atmospheric pressure in the presence of 0.1 gram of platinum oxide. The hydrogen uptake in 75 minutes was 65 ml. (theoretical uptake for 0.00205 mol+catalyst: 69.8 ml. at room temperature and atmospheric pressure). The catalyst was removed by filtration and the filtrate was evaporated to give a yellow syrup. Conversion to free base, extraction into chloroform and subsequent evaporation yielded a syrup. Crystallization from benzene/petroleum ether yielded 6,7 - dimethoxy - 1 - [2 - hydroxy - 2 - (4-chlorophenyl)-ethyl] - 2 - methyl - 1,2,3,4 - tetrahydro-isoquinoline as cream prisms of melting point 116° C. to 117° C. Recrystallization from benzene/petroleum ether gave colorless prisms of melting point 125° C. to 126.5° C.

Example 5

This example is included herein to demonstrate alternate methods for producing 6,7 - dimethoxy - 1 - [[1-methyl - 2 - hydroxy - 2 - (4-methoxy-phenyl)]-ethyl]-2 - methyl - 1,2,3,4 - tetrahydro-isoquinoline.

Ia. A mixture of 3 grams (0.0145 mol) of 3,4-dihydro-6,7 - dimethoxy-isoquinoline N-oxide, 7.5 grams (0.051 mol) of p-propenyl-anisole and a few crystals of hydroquinone was heated at a temperature of 100° C. for a period of 22 hours, by which time thin layer chromatography showed complete disappearance of the N-oxide from the reaction mixture. The reaction mixture was dissolved in ether, insoluble amorphous material being filtered off. The ethereal solution so obtained was extracted with three portions of 2-N hydrochloric acid, and the combined aqueous extracts were basified and extracted with chloroform. The chloroform was removed under reduced pressure and the residual syrup was dissolved in ethanol. The ethanolic solution was treated with ethyl ether/hydrogen chloride to obtain crystalline 8,9-dimethoxy - 1 - methyl - 2 - (4 - methoxy-phenyl) - 1,5,6,10b-tetrahydro - 2H - isoxazolo [3,2-a] isoquinoline hydrochloride of melting point 188° C. to 192° C. Recrystallization from ethanol/ethyl ether yielded the compound melting point at 190° C. to 194° C.

A second steroisomer of melting point 150° C. was also obtained.

Ib. 1.96 grams (0.005 mol) of 8,9-dimethoxy-1-methyl-2 - (4 - methoxy-phenyl) - 1,5,6,10b - tetrahydro-2-H-isoxazolo[3,2-a]isoquinoline hydrochloride, melting point 188° C. to 192° C., produced as described in paragraph Ia of this example, were dissolved in 50 ml. of methanol. The solution was hydrogenated at room temperature and atmospheric pressure in the presence of 0.5 gram of 5% palladium-on-carbon catalyst; the hydrogen uptake after 200 minutes was 138 ml. (theoretical uptake: 124 ml. at room temperature and atmospheric pressure). The catalyst was removed by filtration. The solution was concentrated, and treated with ether to give 6,7-dimethoxy-1-[[1-methyl-2-hydroxy-2-(4 - methoxy - phenyl)] - ethyl]-1,2,3,4-tetrahydro-isoquinoline hydrochloride in the form of colorless prisms of melting point 221° C. to 224° C. Recrystallization from ethanol gave a product of melting point 222° C. to 224° C.

Ic. The 6,7 - dimethoxy-1-[[1-methyl-2-hydroxy-2-(4-methoxy - phenyl)]-ethyl]-1,2,3,4-tetrahydro-isoquinoline hydrochloride, produced as described in the immediately preceding paragraph, was converted into 6,7-dimethoxy-1-[[1 - methyl-2-hydroxy-2-(4-methoxy-phenyl)]-ethyl]-2-methyl - 1,2,3,4 - tetrahydro-isoquinoline by reductive methylation using formaldehyde and hydrogen in the presence of platinum oxide.

IIa. The 8,9-dimethoxy-1-methyl-2-(4-methoxy-phenyl)-1,5,6,10b - tetrahydro - 2H - isoxazolo[3,2-a]isoquinoline hydrochloride, produced as described in paragraph Ia of this example, was converted into 6,7-dimethoxy-1-[[1-methyl - 2 - hydroxy - 2 - (4 - methoxy-phenyl)]-ethyl]-2-methyl-1,2,3,4-tetrahydro-isoquinoline by N-methylation and subsequent hydrogenolysis using the procedures described in paragraphs IIa and IIb of Example 4.

Example 6

In a manner analogous to that described in Example 4(Ia–Ic) above, 6,7-dimethoxy - 1 - (2-hydroxy-2-phenyl-ethyl)-2-methyl - 1,2,3,4 - tetrahydro-isoquinoline (melting point 128° C.) is obtained by condensation of 3,4-dihydro-6,7-dimethoxy-isoquinoline N-oxide with styrene, hydrogenolysis of the resulting 8,9-dimethoxy-2-phenyl-1,5,6,10b - tetrahydro - 2H - isoxazolo[3,2-a]isoquinoline (melting point of the hydrochloride 164°–166° C.) to form 6,7-dimethoxy-1-(2-hydroxy-2-phenyl-ethyl)-1,2,3,4-tetrahydro-isoquinoline (melting point 134°–135° C.), and N-methylation of the latter compound.

Example 7

5 g. (0.0234 mol) of 3,4-dihydro-6,7-dimethoxy-isoquinoline N-oxide and 4 g. (0.03 mol) of p-methoxy-styrene are heated together in a nitrogen atmosphere for 16 hours at 70° C. and then for 2.5 hours at 100° C. in order to complete the reaction. Excess p-methoxy-styrene is removed under reduced pressure and the residual syrup is dissolved in methanol and heated with ethereal hydrogen chloride to yield 8,9 - dimethoxy - 2 - (4-methoxy-phenyl) - 1,5,6,10b - tetrahydro - 2H - isoxazolo[3,2-a]isoquinoline-hydrochloride in the form of crystals melting at 171°–172° C.

2 g. (0.005 mol) of 8,9 - dimethoxy - 2 - (4-methoxy-phenyl)-1,5,6,10b-tetrahydro - 2H - isoxazolo[3,2-a]isoquinoline-hydrochloride are dissolved in water, the solution is made alkaline with potassium hydroxide and extracted with chloroform. Evaporation of the chloroform extract gives the free base as a syrup.

This base is dissolved in 50 ml. of methanol, treated with 3 ml. of methyl iodide and heated under gentle reflux for 1 hour. The solution is concentrated and treated with ether to give 8,9-dimethoxy-2-(4-methoxy-phenyl)-4-methyl-1,5,6,10b-tetrahydro - 2H - isoxazolo[3,2-a]isoquinolinium-iodide as colorless prisms melting at 154°–155° C. Analysis shows that this methiodide crystallized as a partial hydrate.

1.8 g. (0.0027 mol) of the 8,9-dimethoxy - 2 - (4-methoxy-phenyl)-4-methyl - 1,5,6,10b - tetrahydro-2H-isoxazolo[3,2-a]isoquinolinium-iodide prepared according to the details given above are dissolved in 60 ml. of methanol. 0.1 g. of platinum oxide is added and the mixture is hydrogenated in a nitrogen atmosphere at 20° C. under atmospheric pressure. The theoretical amount of hydrogen is taken up after 2 hours. The catalyst is removed by filtration and the filtrate is evaporated to a syrup. Water is added and the resulting solution is made alkaline with potassium hydroxide and extracted with chloroform. Evaporation of the chloroform under reduced pressure gives a syrup which is crystallized from benzene/petroleum ether to give 6,7-dimethoxy-1-[2-hydroxy-2-(4-methoxy-phenyl)-ethyl]-2-methyl - 1,2,3,4 - tetrahydro-isoquinoline as prisms of melting point 128°–129° C.

Example 8

The 6,7 - dimethoxy - 1 - [2-hydroxy-2-(4-methoxy-phenyl)-ethyl] - 2 - methyl - 1,2,3,4 - tetrahydro-isoquinoline is also obtained by condensation of 3,4-dihydro-6,7-dimethoxy-isoquinoline N-oxide, hydrogenolysis of the resulting 8,9 - dimethoxy-2-(4-methoxy-phenyl)-1,5,6,10b-tetrahydro-2H-isoxazolo[3,2-a]isoquinoline and N-methylation of the product of hydrogenolysis.

Example 9

A pharmaceutical preparation is made up in the form of tablets, each of said tablets containing 3 mg. of 6,7-dimethoxy - 1 - [[2-hydroxy - 2 - [pyridyl-(4)]-ethyl]-2-methyl-1,2,3,4-tetrahydro-isoquinoline, 45.5 mg. of corn starch, 46.5 mg. of lactose, 4.5 mg. of talc and 0.5 mg. of magnesium stearate.

We claim:

1. A compound selected from the group consisting of a member having the formula

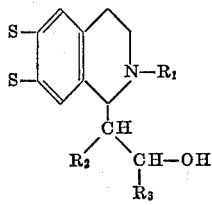

in which the symbol $R_1$ is an alkyl group; $R_2$ is a member selected from the group consisting of hydrogen and alkyl; $R_3$ is pyridyl; S is a member selected from the group consisting of hydroxy, lower alkoxy and lower alkylenedioxy, the latter member being formed by two adjacent S alkoxy substituents; and salts thereof with medicinally acceptable acids.

2. The compound of claim 1 wherein $R_1$ is methyl, $R_2$ is hydrogen and S is alkoxy.

3. The compound of claim 2 wherein $R_3$ is a pyridyl-(2) radical.

4. The compound of claim 2 wherein $R_3$ is a pyridyl-(4) radical.

5. A compound selected from the group consisting of 6,7-dimethoxy-1-[2-hydroxy - 2 - [pyridyl-(4)]-ethyl]-2-methyl-1,2,3,4-tetrahydro-isoquinoline and a medicinally acceptable acid addition salt thereof.

6. A compound selected from the group consisting of 6,7-dimethoxy-1-[2-hydroxy - 2 - [pyridyl-(2)]-ethyl]-2-methyl-1,2,3,4-tetrahydroisoquinoline and a medicinally acceptable acid addition salt thereof.

7. A process for producing a compound having the formula

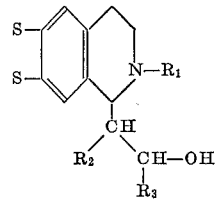

in which the symbol $R_1$ is an alkyl group; $R_2$ is a member selected from the group consisting of hydrogen and alkyl; $R_3$ is pyridyl; S represents a member selected from the group consisting of hydroxy, lower alkoxy and lower alkylenedioxy, the latter member being formed by two adjacent S alkoxy substituents; which comprises condensing a N-oxide of the formula

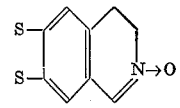

in which the symbol S has the meaning as aforesaid with a vinyl compound having the formula

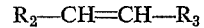

$$R_2-CH=CH-R_3$$

in which the symbols $R_2$ and $R_3$ have the meaning as aforesaid subsequently subjecting the 1,5,6,10b-tetrahydro-2H-isoxazolo[3,2-a]isoquinoline condensation product to hydrogenolysis using hydrogen in the presence of palladium-charcoal catalyst and thereafter alkylating the hydrogenolysis product.

References Cited

UNITED STATES PATENTS

| | | | |
|---|---|---|---|
| 3,029,247 | 4/1962 | Schut | 260—289 X |
| 3,143,550 | 8/1964 | Evans et al. | 260—289 X |
| 3,227,720 | 1/1966 | Brossi et al. | 260—289 |
| 3,238,212 | 3/1966 | Brossi et al. | 260—289 X |

FOREIGN PATENTS 190,517   7/1957   Austria.

ALEX MAZEL, Primary Examiner

D. G. DAUS, Assistant Examiner

U.S. Cl. X.R.

260—289, 290, 329; 424—258